Jan. 5, 1937.  W. H. SNYDER  2,066,368
ANTISKID DEVICE
Filed April 25, 1935  3 Sheets-Sheet 1
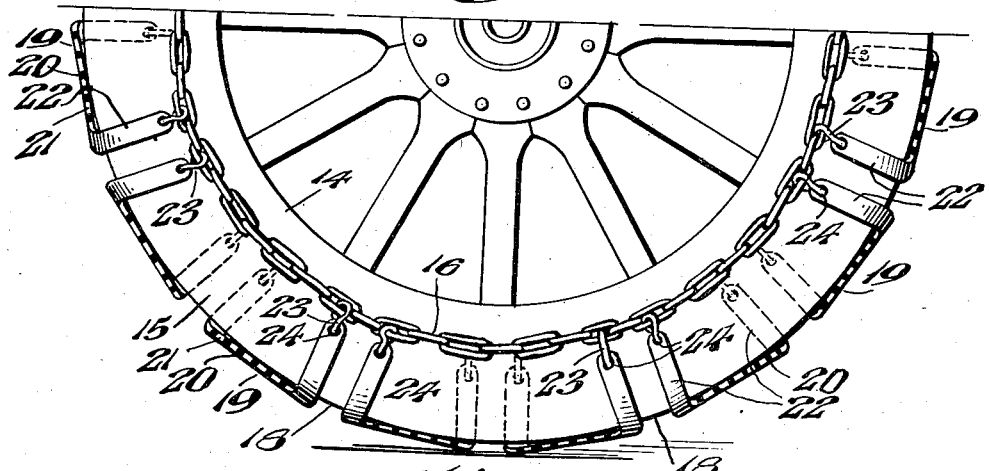
Fig. 1.
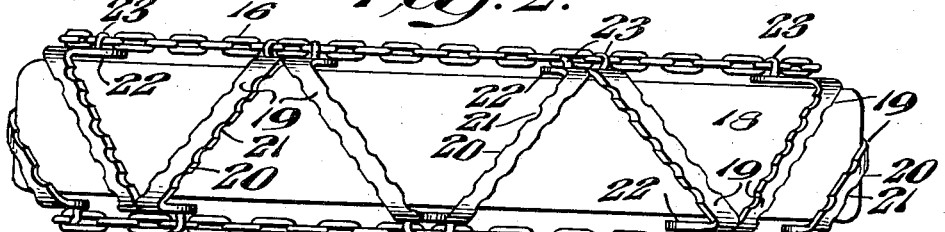
Fig. 2.
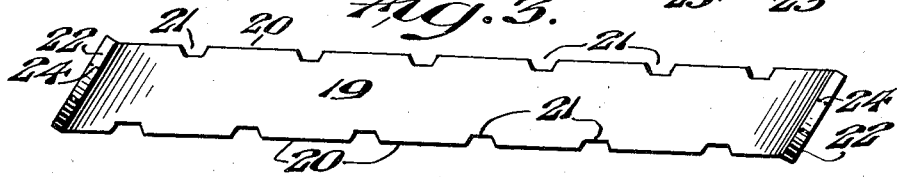
Fig. 3.
Fig. 4.
Fig. 5.
INVENTOR.
WILLIAM H. SNYDER.
BY
Louis Nycho
ATTORNEY.

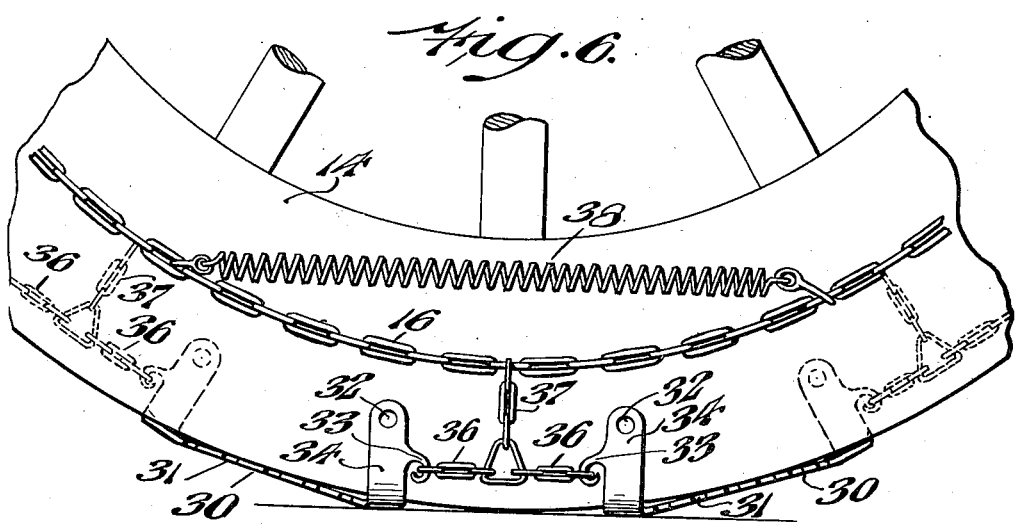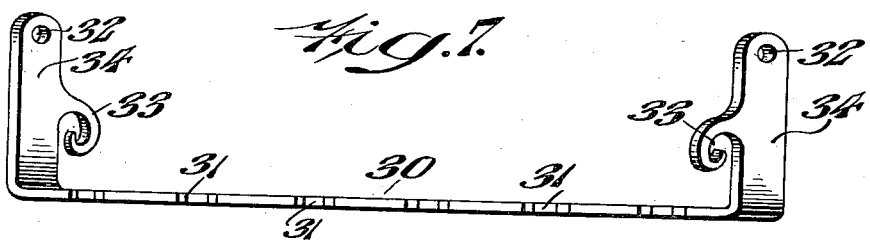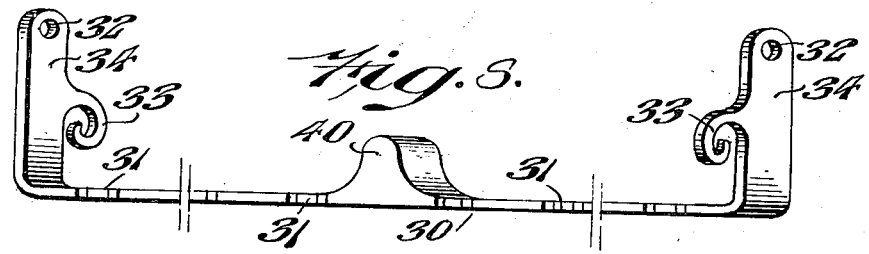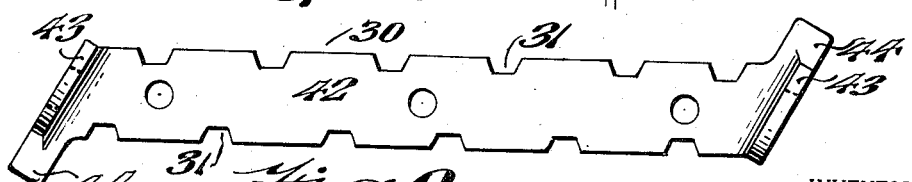

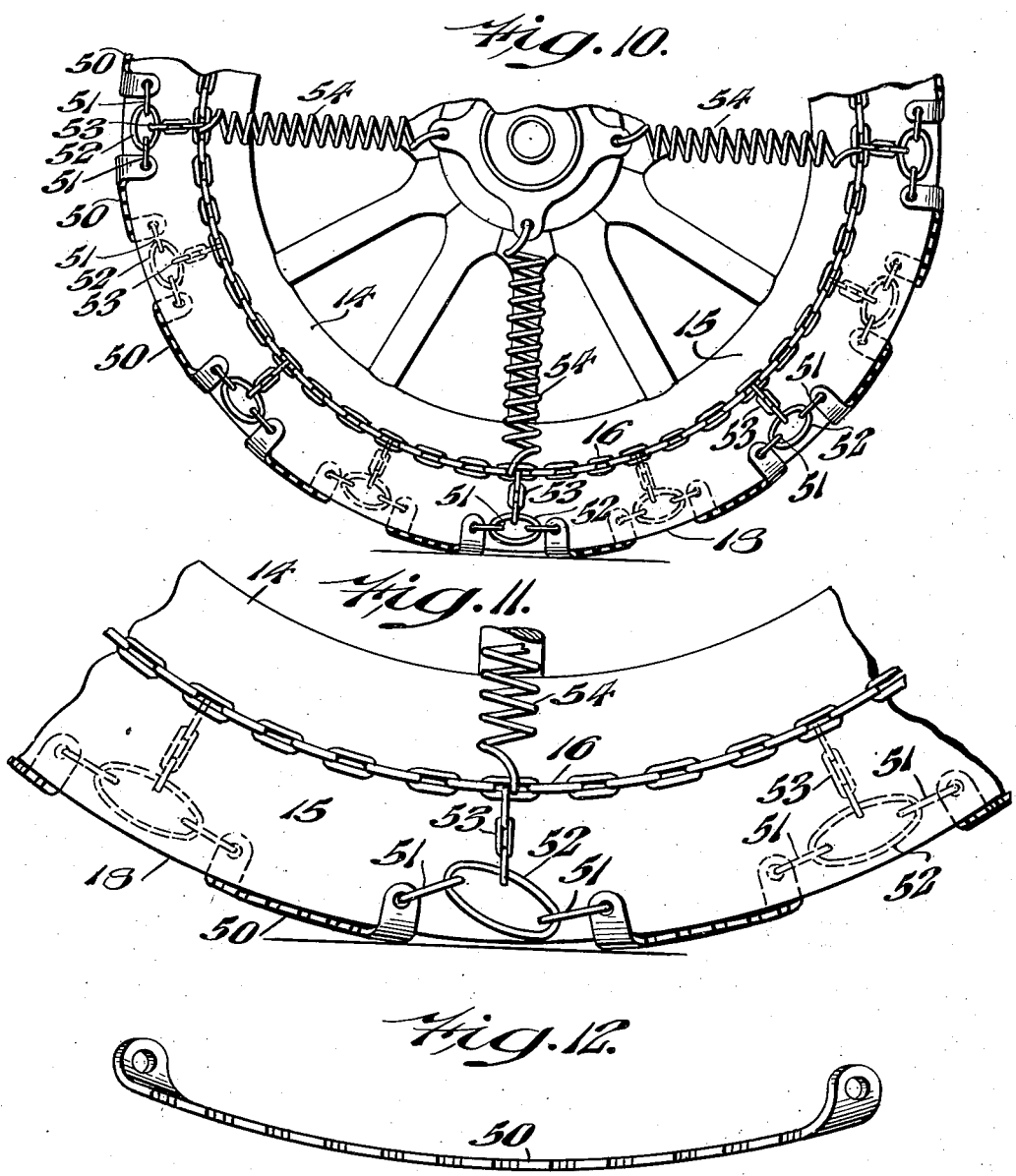

Patented Jan. 5, 1937

2,066,368

UNITED STATES PATENT OFFICE 2,066,368

ANTISKID DEVICE

William H. Snyder, Elkins Park, Pa.

Application April 25, 1935, Serial No. 18,081

1 Claim. (Cl. 152—14)

My invention relates to a new and useful anti-skid device specially adapted for application to pneumatic or solid tires of automotive vehicles to prevent the skidding of such vehicles on icy roads, by giving such vehicles added traction in the nature of a positive engagement between the treads of the wheels thereof and the surface of the road. My invention further relates to an anti-skid device which is inexpensive to produce and easy to apply and one, which in practice, I have found to be effective for the purpose intended.

The construction of my anti-skid device will be more fully understood from the following specifications and the accompanying drawings in which:—

Fig. 1 represents a side elevation of the lower half of a wheel provided with an anti-skid device embodying my invention.

Fig. 2 represents a plan view of Fig. 1.

Figs. 3, 4 and 5 represent different views of the tread member of my anti-skid shown detached.

Fig. 6 represents a fragmentary view in side elevation showing a modified form of construction.

Fig. 7 represents a view of the tread member used in Fig. 6, shown detached.

Fig. 8 represents a view similar to Fig. 7 showing a modified form of tread member.

Fig. 9 represents a perspective view of another modified form of anti-skid device forming part of my invention.

Fig. 10 represents a view similar to Fig. 1 showing a still further modified form of construction.

Fig. 11 is a view similar to Fig. 10 on an enlarged scale, showing the manner of operation of the form illustrated in Fig. 10.

Fig. 12 represents a perspective view of the tread member used in the modification of Figs. 10 and 11 shown detached.

Referring to the drawings in which like reference characters indicate like parts, and more particularly to Fig. 1, 14 designates a wheel provided with a pneumatic or solid tire 15. The tire 15 is provided with the anti-skid device embodying my invention, which comprises the supporting chains 16 and 17, which are disposed along the inboard and outboard faces of the tire at a point above the tread 18 thereof. The chains 16 and 17 support the anti-skid devices 19 which are in the form of oblique elongated slats, made of any desirable metal and having the notches, teeth, or serrations 21. The anti-skid devices 19 are provided with the lugs or ears 22, which are connected by the links 23, engaging the holes 24 to the links of the supporting chains 16 and 17. The anti-skid devices 19, as can be seen from Fig. 2, are disposed in opposite angular directions, so that the opposite juxtaposed ends of the anti-skid devices meet or converge at opposite points along the periphery of the tread of the tire. By this arrangement a portion of at least one of the anti-skid devices 19 is at all times under the tire and in contact with the road as will be seen from Fig. 1. The notches or teeth 21 on the opposite longitudinal edges of the members 19, serve to cut into the glazed surface of an icy road, thus resulting in positive engagement with the road surface and preventing the sliding of the wheels transversely of the direction of travel of the vehicle, as well as giving the vehicle motion and stopping traction. Since the straight edges 20 as well as the intermediate notches 21 are equally in contact with the surface of the road, I have found that the wear is uniform on the notches as well as the straight edges, so that the teeth or notches 21 do not wear out except as the entire device is worn out by use.

In Fig. 6 I have shown a modified form in which I use the anti-skid device 30, having the notches or teeth 31 and having either the holes 32 or the hooks 33 in the end lugs 34 thereof, each pair of adjacent anti-skid devices being interconnected by transverse chain links 36 and secured by a common vertical chain section 37 to the supporting side chains 16 and 17, which in turn are tensioned by the transverse segmentary spreaders 38.

In Fig. 8 I have shown the anti-skid device illustrated in Fig. 7 as adapted for application to a dual tire arrangement, by providing the central annular lug or wedge 40, adapted to engage the space normally occurring between dual tires.

In Fig. 9 I have illustrated a further modified form of anti-skid device 42, which is provided with a vertical lug 43 for attachment to the supporting chains 16 and 17 of any of the constructions previously described, and which is also provided at the opposite ends thereof with the oppositely extending lugs 44, which form a continuation of the tread portion of the anti-skid device so as to insure constant contact of the anti-skid device with the road surface at the point of convergence of any pair of adjacent devices.

It being understood that in all instances the anti-skid devices shown in Figs. 7, 8 and 9 are arranged in opposite diagonal directions on the tread of the tire as illustrated in Fig. 2.

In Fig. 10 I have shown a further modification of my invention in which the anti-skid devices 50 shown in perspective in Fig. 12 are arranged on the wheel 14 in much the same manner as was described in connection with Fig. 1 except that the converging ends of adjacent pairs of anti-skid devices 50 are interconnected by means of the short links 51 which engage the relatively long link 52, which in turn is connected by the vertical chain section 53 to the supporting chains 16 and 17, which in turn are tensioned by the vertical spreaders 54. In this construction the relatively large interconnecting link 52 provides automatic adjustment for taking up any slack that may develop in the engagement of the anti-skid devices 50 with the tread of the tire, whether the same being due to wear as in the case of the solid tire, or whether it be due to partial deflation as in the case of the pneumatic tires, since the link 52 being constantly under tension of the spreader 54, will tend, when such slack develops, to move from the taut horizontal position thereof, shown in Fig. 10, to a partly or completely vertical position shown in Fig. 11 in which position the juxtaposed converging ends of adjacent pairs of anti-skid devices 50 are thus drawn together and the slack in the engagement of the anti-skid devices with the tire is thus taken up.

I claim:

An anti-skid device comprising a bar of substantially rectangular cross section, having a tread portion and end portions for securing said device upon a tire, said tread portion having a flat road-engaging surface and having its opposite longitudinal edges notched to provide undulating road-engaging edges to said tread surface and means for securing said device at an angle to the longitudinal axis of said tire, whereby said notches engage the road successively with the rotation of said tire.

WILLIAM H. SNYDER.